Figure 1:
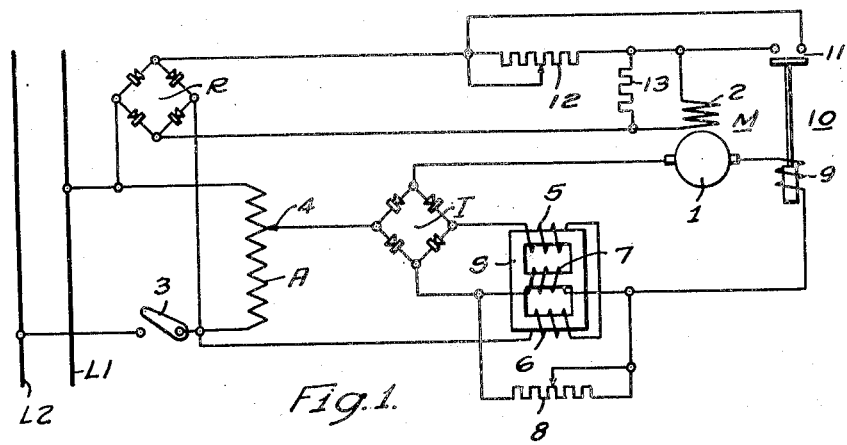

Sept. 20, 1949.  N. D. COOPER  2,482,101
CONTROL SYSTEM

Filed April 30, 1945  2 Sheets-Sheet 1

WITNESSES:
E. A. McCloskey
Wm. L. Groome

INVENTOR
Nelson D. Cooper.
BY
Paul E. Friedermann
ATTORNEY

Sept. 20, 1949.   N. D. COOPER   2,482,101
CONTROL SYSTEM

Filed April 30, 1945   2 Sheets-Sheet 2

WITNESSES:
E. A. McCloskey
Nw. L. Groome

INVENTOR
Nelson D. Cooper.
BY
Paul E. Friedemann
ATTORNEY

Patented Sept. 20, 1949

2,482,101

UNITED STATES PATENT OFFICE 2,482,101

CONTROL SYSTEM

Nelson D. Cooper, Cincinnati, Ohio, assignor to Westinghouse Electric Corporation, East Pittsburgh, Pa., a corporation of Pennsylvania Application April 30, 1945, Serial No. 591,048

4 Claims. (Cl. 318—347)

My invention relates to electric control systems for energizing direct-current motors from an alternating-current source.

It is an object of the invention to provide a control system, applicable for constant speed motors as well as variable speed motors, which affords a high degree of constancy of speed within a wide range of speed adjustment while performing the speed regulation with electric circuit means of great simplicity, small compass and minimum requirements of supervision or maintenance as compared with known control systems of similar operation.

Another object of my invention, allied to the foregoing, is to devise motor control systems of the above-mentioned type in such a manner as to operate with full-wave rectification even in cases where a speed adjustment of high ratio, for instance between the limits of 1 to 10 or 1 to 20, is desired so that a smaller drive motor and smaller auxiliary equipment can be employed than in the known thyratron systems operating with controlled half-wave rectification.

It is also an object of my invention to provide a control system of the type above referred to that lends itself more readily to economical application with small motors than the more complicated and costly regulating and control devices heretofore available.

Having these objects in mind, and in accordance with my invention, I provide the control system of a direct-current drive motor, energized by rectified voltage derived from an alternating-current source, with a saturable reactor and connect the direct-current control winding of the reactor with the armature circuit of the motor so that the impedance of the alternating-current winding of the reactor changes automatically in reverse relation to changes in the IR voltage drop of the armature circuit. Such a reactor is unsaturated within the available range of A. C. voltages and has a substantially linear characteristic (reactance versus D. C. control voltage). I further associate the alternating-current windings of the reactor with the energizing control system of the motor in such a manner that the rectified direct-current voltage impressed on the rectifier increases with increasing IR drop so as to maintain armature voltage and motor speed substantially constant at the desired value regardless of changes in motor load, and substantially independent of the selected speed setting if speed adjustment is provided for.

Other features of the invention will be apparent from the following description of the embodiments shown in the drawings in which Figs. 1, 2, 3, and 4 represent the circuit diagrams of four different control systems all designed and operative in accordance with the invention.

Referring to Fig. 1, the armature of the direct-current motor M to be controlled is denoted by 1 and the appertaining field winding by 2. The motor is energized from the mains L1 and L2 of a single-phase alternating-current line under control by a switch 3. A variable voltage transformer here represented by an autotransformer marked A, is connected through switch 3 to mains L1 and L2. The slider 4 of the autotransformer is connected to the input terminals of a full-wave rectifier T through the alternating-current windings 5 and 6 of a saturable reactor S. The output terminals of the rectifier are connected to the armature 1 of the motor in series with the direct-current control winding 7 of the saturable reactor. An adjusting rheostat 8 is arranged in parallel connection to control winding 7. The armature circuit includes further the control coil 9 of a field relay 10 whose contact is denoted by 11. The field winding 2 of the motor is connected through a field rheostat 12 across the output terminals of another full-wave rectifier R which receives its energization from mains L1 and L2 also under control by switch 3. A discharge resistor 13 is connected in parallel to field winding 2. The above-mentioned contact 11 of field relay 10 lies in shunt relation to the field rheostat 12.

When switch 3 is closed, both the armature circuit and field circuit of the motor are energized. The voltage impressed across armature 1 is determined by the setting of slider 4. At first, relay 10 is operative and closes contact 11 so that the field winding 2 receives full excitation until the motor has accelerated to a given speed at which relay 10 drops out. From then on, the speed of the motor is also determined by the setting of field rheostat 12.

The impedance of reactor windings 5 and 6 depends on the degree of premagnetization of the reactor core and hence on the excitation of the direct-current winding 7. This excitation, in turn, is dependent on the load current in the armature circuit, and more particularly, corresponds to a proportion of the load current adjusted by the selected setting of rheostat 8. Therefore, an increase in load current will increase the degree of magnetization of the reactor S and hence will decrease the impedance of the alternating-current windings 5 and 6. In other words, the reactor is normally unsaturated and has a substantially linear characteristic. In this manner the alternating-current voltage imposed on the input terminals of the rectifier T is increased with increasing load in the armature circuit, and the system is so adjusted by means of the rheostat 8 that this voltage increase compensates substantially for the IR voltage drop across the rectifier. Thus, the voltage imposed on the armature of the motor is maintained at an approximately constant value from no-load to full load for any voltage derived from the variable transformer A. Consequently, the control system provides a satisfactory speed regulation of the motor independent of changes in motor load and for the available range of speeds.

Figure 2:
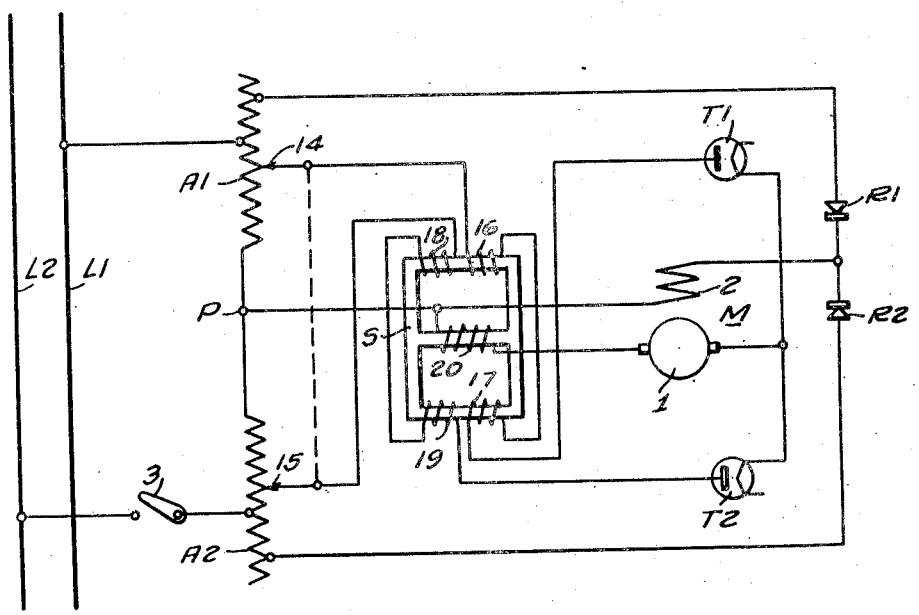

In the embodiment according to Fig. 2, the armature 1 and field winding 2 of the motor M are energized from the mains L1 and L2 of a single-phase alternating-current line through two series connected autotransformers A1 and A2 under control by a switch 3. The mid-point or common terminal of the two transformers is denoted by P. The respective slide contacts 14 and 15 of the two transformers are preferably ganged together as is schematically indicated by a dash and dot line, and move in unison in such a manner that their position is always substantially symmetrical to the mid-point P. A saturable reactor S is provided with four alternating-current windings denoted by 16, 17, 18 and 19, respectively, and has a direct-current control winding 20 on its center leg. Slider 14 is connected through windings 16 and 17 with the anode of an electronic rectifier tube T1. Similarly, slider 15 is connected through windings 18 and 19 to the anode of another rectifier tube T2. The cathodes of tubes T1 and T2 are interconnected, and the motor armature 1 is series connected with the reactor winding 20 between the two cathodes and the transformer mid-point P. The field winding 2 of motor M is energized from transformers A1 and A2 through two rectifiers R1 and R2, for instance, of the junction type.

When switch 3 is closed, the armature 1 receives full-wave rectified current through the alternately conductive tubes T1 and T2, and the field winding is excited by full-wave rectified current passing alternately through the rectifiers R1 and R2. During the conductive periods of tube T1, the current passing through this tube is controlled by the impedance of the two windings 16 and 17. Since these two windings are arranged on opposite legs of the reactor core relative to the central leg on which the control winding 20 is located, the alternating current has no resultant inductive effect on the winding 20. During the periods in which tube T2 is conductive, its plate current is determined by the impedance of windings 18 and 19 which have also no resultant inductive effect on winding 20. The impedance of the four alternating-current windings of reactor S depends on the premagnetization of the reactor core caused by the excitation of winding 20. It will be seen from Fig. 2 that the winding 20 lies in the armature circuit of motor M, and hence is energized in accordance with the load current. Consequently, the alternating current derived from the transformers A1 and A2 and rectified by the tubes T1 and T2 has a magnitude which depends on the controlled impedance of windings 16 through 19, and consequently on the current load in the armature circuit. As in the example of Fig. 1, the magnetizing effect of winding 20 is so rated that an increase in motor load causes a substantially proportional decrease in impedance of the alternating-current windings, and thereby an increase in the alternating-current voltage effective across the electrodes of tubes T1 and T2. In this manner, the voltage across the armature 1 is kept substantially constant, irrespective of changes in load current and within the entire available range of adjustment of the transformers A1 and A2.

Figure 3:
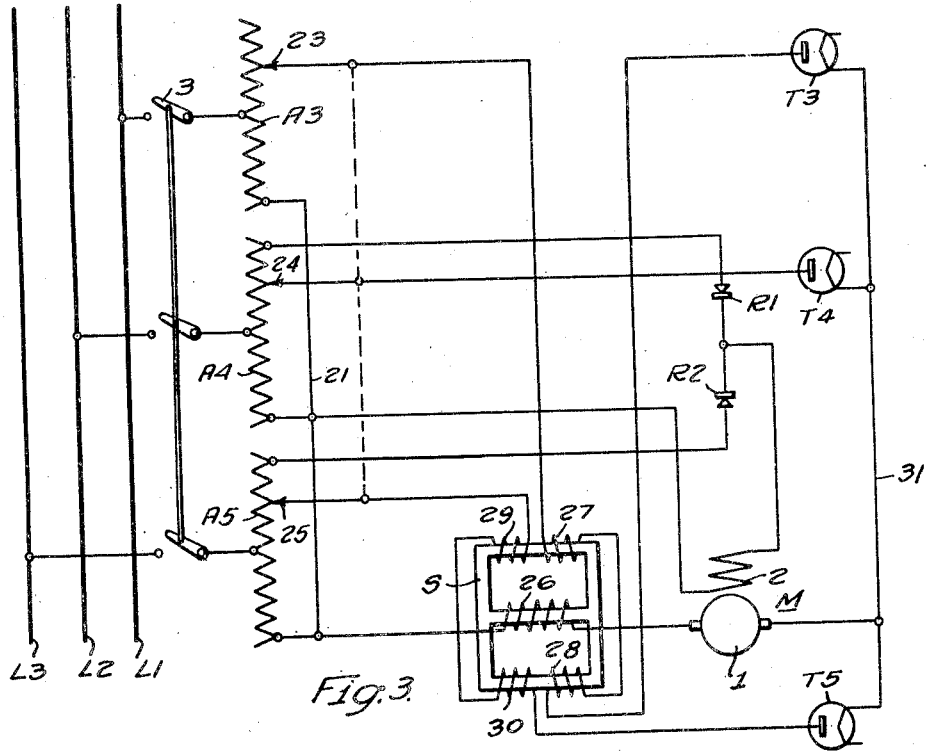

The embodiment illustrated in Fig. 3 is similar to that of Fig. 2 but provides for a three-phase connection of the rectifiers feeding the armature circuit of the motor. The mains L1, L2 and L3 of the alternating-current line are connected through the contacts of a switch 3 with the respective terminals of three autotransformers A3, A4 and A5. The other terminals of these transformers are attached to a common lead 21. The sliders 23, 24 and 25 of the three transformers are interconnected, as is represented by a dot and dash line so that they move in unison when the transformers are adjusted to a different output voltage. The common lead 21 of the transformers is connected to the motor armature 1 in series with the direct-current control winding 26 of a saturable reactor S whose alternating-current windings are denoted by 27, 28, 29 and 30, respectively. Slider 23 of transformer A3 is connected through windings 27 and 28 to the anode of a rectifier tube T3. Slider 24 of transformer A4 is directly connected to the anode of a rectifier tube T4, and slider 25 of transformer A5 is connected through reactor windings 29 and 30 to the anode of a rectifier tube T5. The cathodes of the three rectifier tubes are interconnected by a lead 31 which is attached to one pole of the armature 1. Through these connections, the armature 1 is fed by three-phase rectified current whose magnitude is dependent upon the impedance of the alternating-current windings on the reactor and hence controlled by the excitation of the direct-current winding 26. Consequently, the voltage across the armature 1 is regulated so as to remain approximately constant under varying loads and at different settings of the transformer sliders in the manner explained previously in conjunction with the embodiments of Figs. 1 and 2. The field winding 2 of motor M according to Fig. 3 is energized from transformers A4 and A5 through two rectifiers R1 and R2 in full-wave connection.

Figure 4:
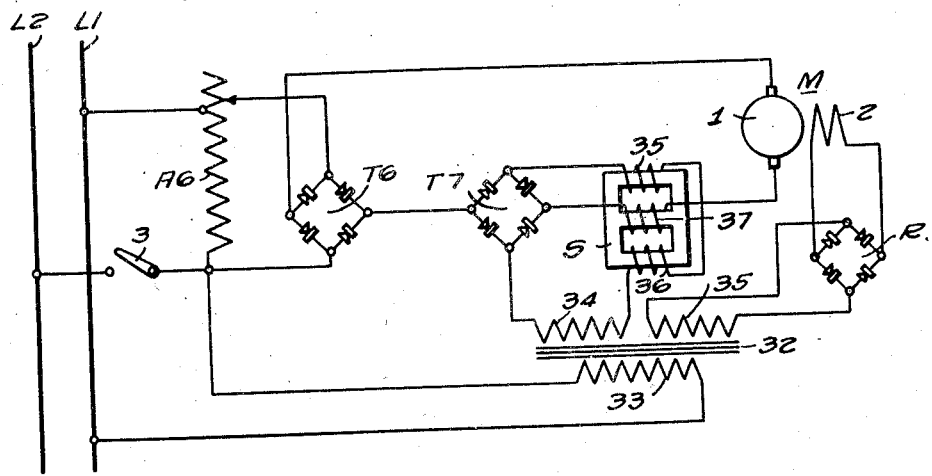

The control system illustrated in Fig. 4 represents a modification of the invention which permits obtaining a satisfactory speed regulation of the motor over an especially wide range of speeds. According to Fig. 4, the autotransformer A6 is primarily connected through a switch 3 to the mains L1 and L2 of a single-phase alternating-current line. The secondary side of transformer A6 is connected to the input terminals of a full-wave rectifier T6. When switch 3 is closed, a direct-current voltage appears across the output terminals of rectifier T6 and has a magnitude determined by the chosen setting of the transformer. Connected in series with rectifier T6 is the output circuit of another rectifier T7 which receives its primary excitation from a transformer 32. This transformer has its primary winding 33 connected across mains L1 and L2 under control by the above-mentioned switch 3 and is provided with two secondary windings 34 and 35. Winding 34 is connected to the input terminals of rectifier T7 through the alternating-current windings 35 and 36 of a saturable reactor S. Consequently, when switch 3 is closed a component direct-current voltage appears across the output terminals of rectifier T7 whose magnitude is determined by the impedance of coils 35 and 36, and hence is controlled by the excitation of the direct-current control winding 37 of the reactor. This control winding lies in series with the output terminals of rectifiers T6 and T7 in the load circuit of the motor armature 1. Therefore, the voltage component provided by the rectifier T7 varies its magnitude in dependence upon the armature load current. In other words, the voltage across the armature 1 is the resultant of two voltage components supplied by the rectifiers T6 and T7. The component voltage of rectifier T6, in accordance with the setting of the transformer A6, is indicative of the desired motor speed. The component voltage appearing across the rectifier T7 is variable and is automatically increased when the IR drop in the armature and rectifier circuit increases. As a result, the voltage drop across the armature 1 is kept at a substantially constant value irrespective of load variations and independent of the setting of transformer A6 within the available range of motor speeds. The secondary core winding 35 of transformer 32 energizes its rectifier R3 which, in turn, supplies excitation for the motor field winding 2.

It will be understood that in the above described systems according to the invention the illustrated electronic rectifiers may be replaced by dry or junction-type rectifiers or vice versa, in accordance with the requirements or desiderata of any particular case of application. It will further appear from the example of Fig. 1 that auxiliary adjusting devices such as represented by the calibrating rheostat 8, the field rheostat 12 of field relay 10 may also be employed in embodiments of the type shown in Figs. 2, 3 and 4. For the sake of simplicity, I have not illustrated such various additions and modifications as starting resistors, accelerating contactors, dynamic braking resistors, reversing contactors and the like which can readily be added by anyone skilled in the art to suit any particular motor size and application. It thus will be evident that the control systems of the type described may be modified in different respects without departing from the essence of my invention, and within the scope of the essential features of the invention as set forth in the claims annexed hereto.

I claim as my invention:

1. A control system for operating a direct-current drive from an alternating-current source, comprising center-tapped adjustable transformer means for deriving an adjustable alternating-current voltage from said source, two half-wave rectifiers connected mutually in opposition to said transformer means and having a common connection to the center tap of said transformer to produce a full-wave rectified voltage across said connection, a direct-current motor having an armature disposed in said connection to be energized by said rectified voltage, saturable reactor means of substantially linear characteristic having two pairs of alternating-current windings and a direct-current control winding arranged relative to one another so that the two windings of each of said pairs substantially balance each other as regards their effect on said control winding, said pairs of windings being connected between said circuit means and said two rectifiers, respectively, and said control winding being disposed in said common connection to be energized in accordance with the IR drop of said connection for changing the impedance of said alternating-current windings in substantially inverse relation to changes in said voltage drop.

2. A motor control system, comprising a direct-current motor having an armature, alternating-current supply means of adjustable voltage, a saturable reactor of linear characteristic having an alternating-current main winding of variable reactance and a direct-current control winding for varying said reactance, a rectifier having an input circuit connected in series with said main winding to said supply means and having an output circuit connected in series with said control winding and said armature.

3. A motor control system, comprising a direct-current motor having an armature circuit, alternating-current supply means, a rectifier connecting said armature circuit with said supply means to provide said circuit with rectified voltage, a normally unsaturated reactor having an alternating-current main winding of variable reactance series-connected between said supply means and said rectifier and having a direct-current control winding for controlling said reactance, said control winding being connected in said armature circuit to be energized in accordance with the IR voltage drop in said circuit and poled for changing said reactance in inverse relation to changes in said voltage drop.

4. A motor control system, comprising a separately excited direct-current motor having an armature, an adjustable-voltage transformer, a saturable reactor of linear characteristic having an alternating-current main winding of variable reactance and a direct-current control winding for varying said reactance, a rectifier having an input circuit connected in series with said main winding to said transformer and having an output circuit series-connected with said control winding and said armature, said control winding being poled to reduce said reactance with increasing armature current for maintaining the motor speed substantially at a constant value corresponding to the adjusted transformer voltage.

NELSON D. COOPER.

REFERENCES CITED

The following references are of record in the file of this patent:

UNITED STATES PATENTS

| Number | Name | Date |
| --- | --- | --- |
| 765,203 | Scott | July 19, 1904 |
| 1,426,123 | Stoekle | Aug. 15, 1922 |
| 2,082,496 | Howe | June 1, 1937 |
| 2,086,594 | Young | July 13, 1937 |
| 2,100,715 | Jenks | Nov. 30, 1937 |
| 2,346,997 | Priest | Apr. 18, 1944 |

FOREIGN PATENTS

| Number | Country | Date |
| --- | --- | --- |
| 388,555 | Germany | Jan. 15, 1924 |